Aug. 30, 1955          L. A. COX          2,716,487
NUT AND WASHER ASSEMBLY SELECTOR
Filed Sept. 20, 1952          3 Sheets-Sheet 1
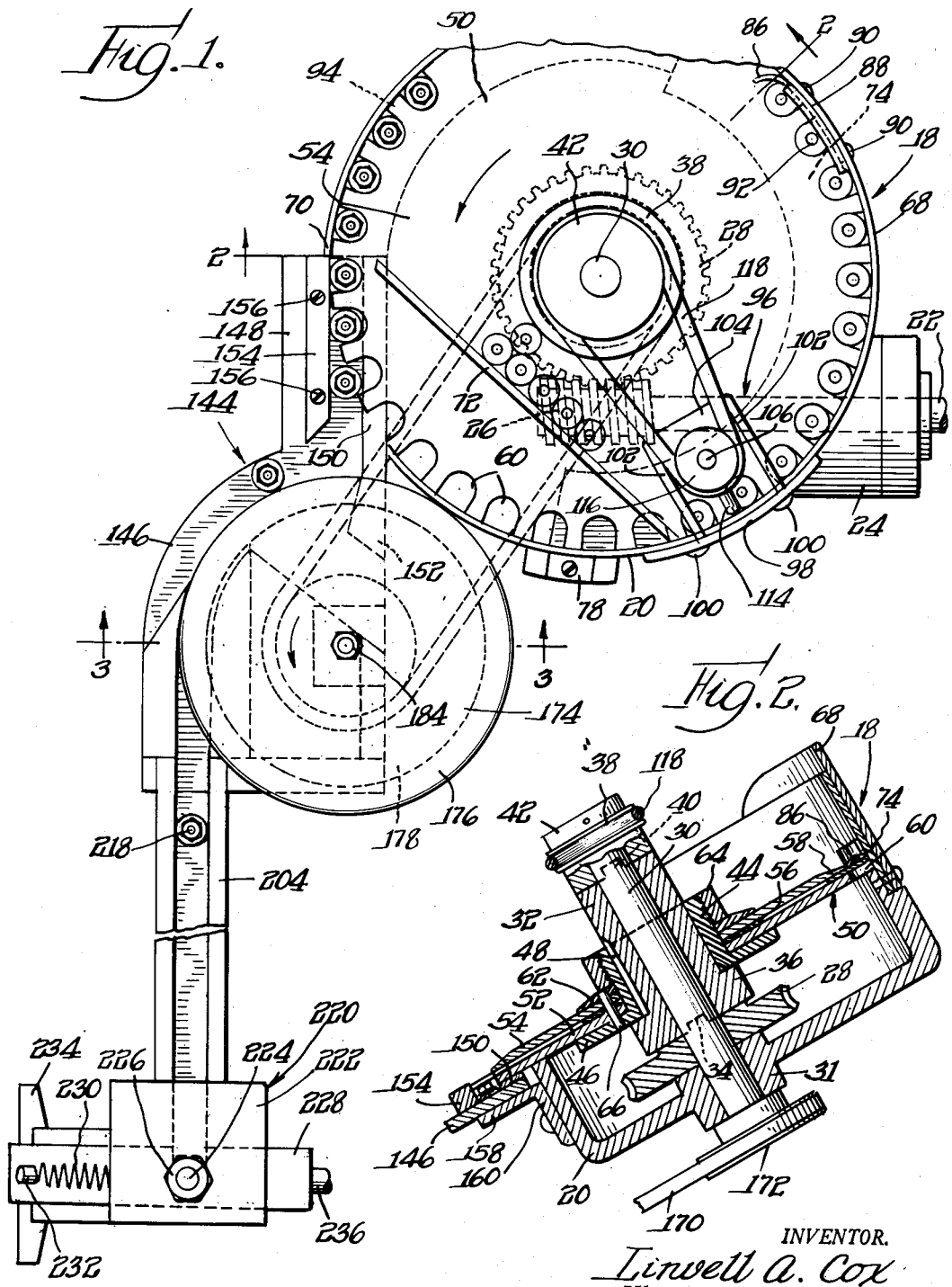
INVENTOR.
Linwell A. Cox
BY Moore, Olson & Trexler
attys.

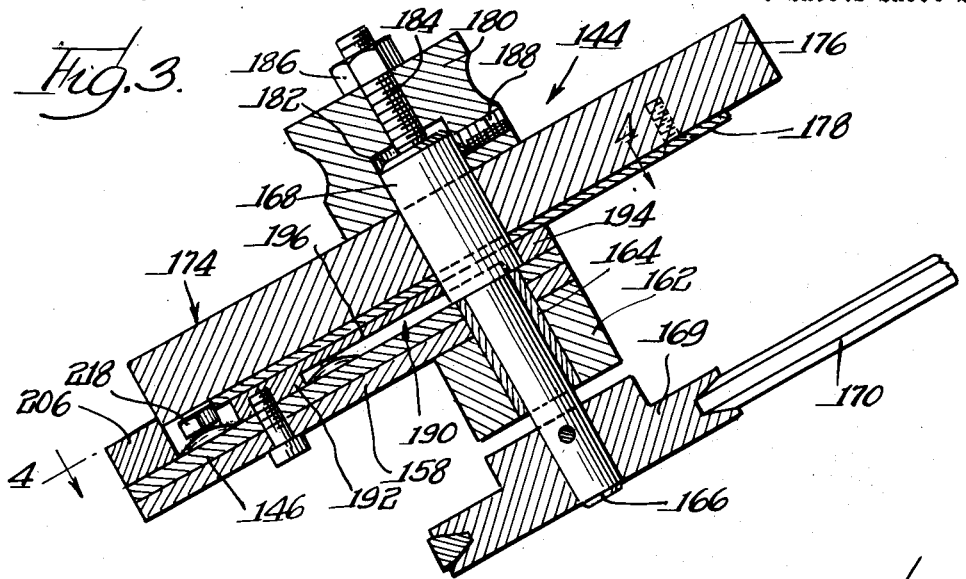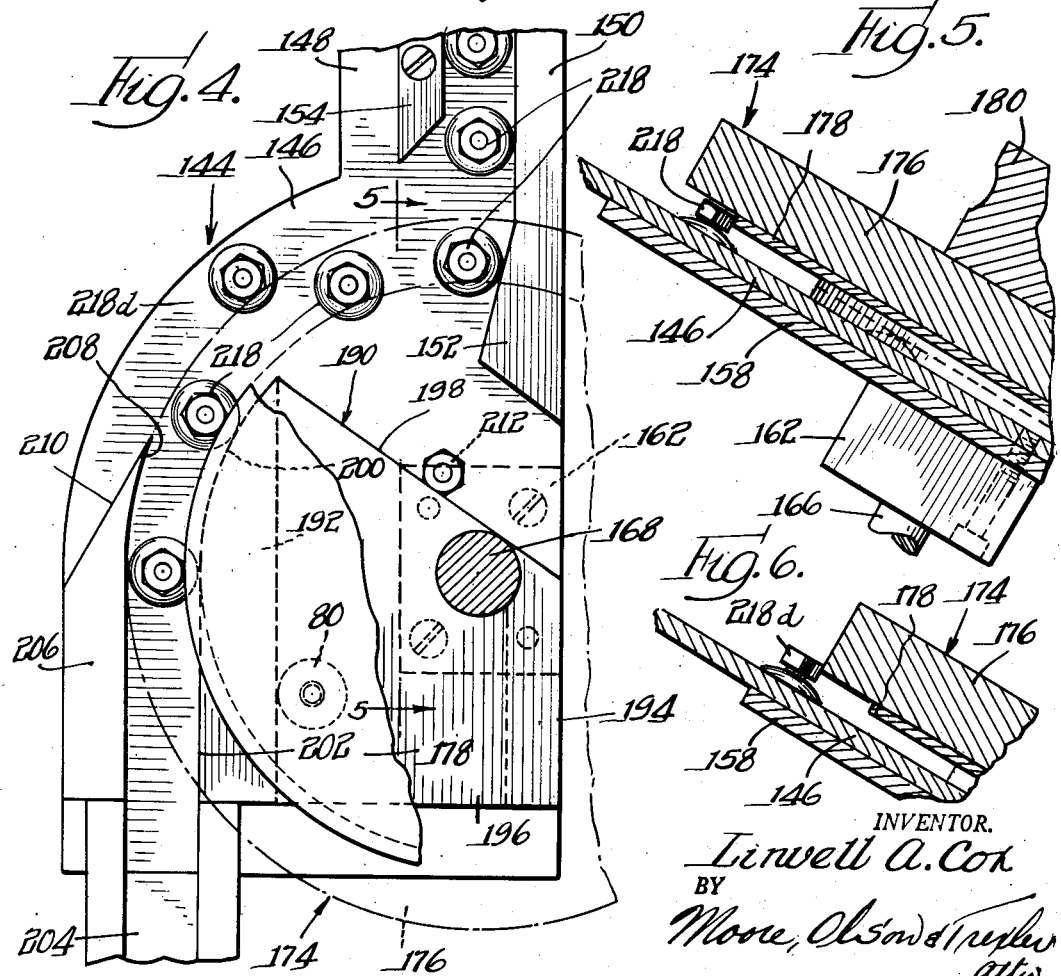

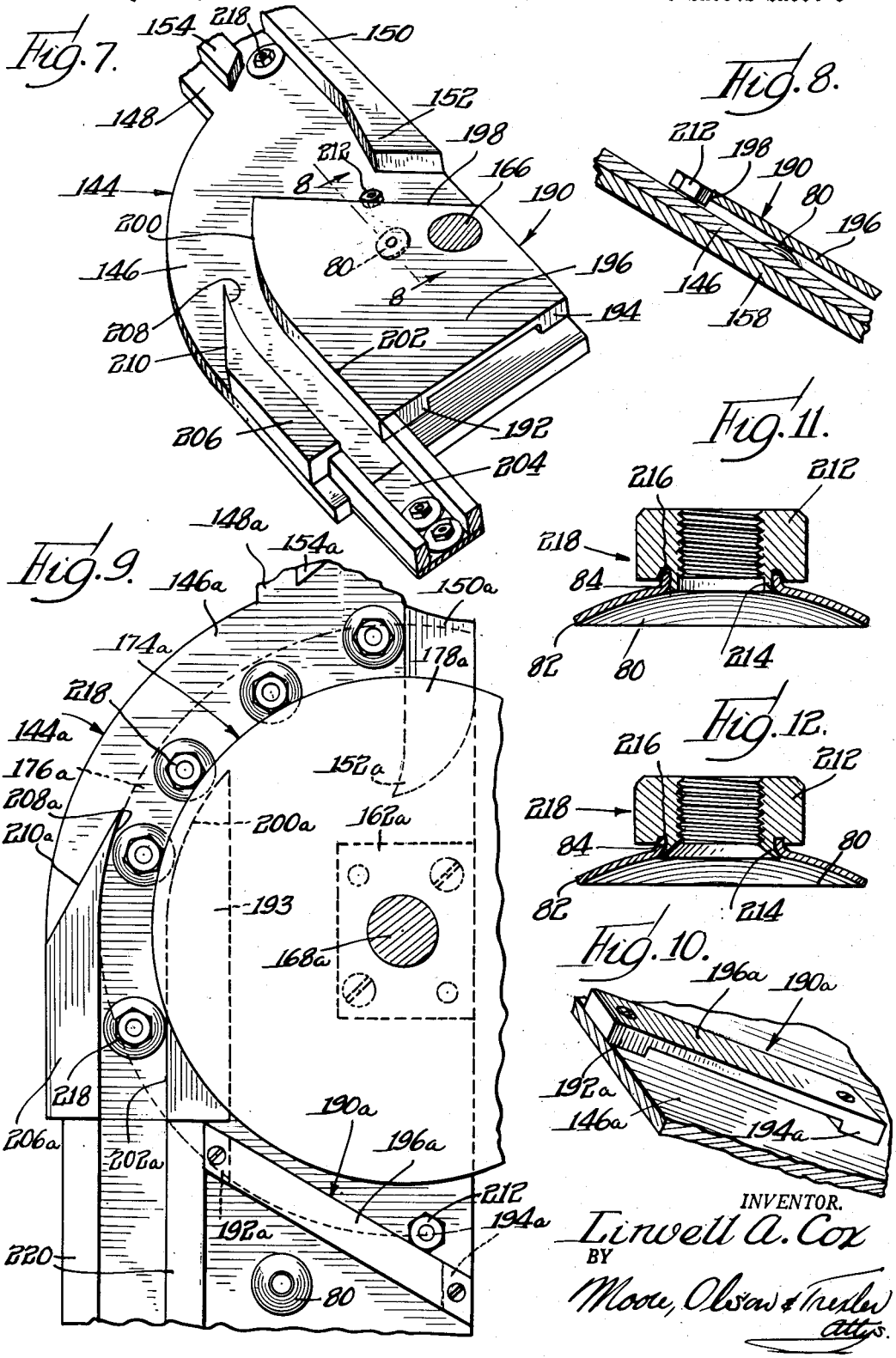

2,716,487
NUT AND WASHER ASSEMBLY SELECTOR

Linvell A. Cox, Chicago, Ill., assignor to Illinois Tool Works, Chicago, Ill., a corporation of Illinois Application September 20, 1952, Serial No. 310,700

17 Claims. (Cl. 209—91)

This invention is concerned with an assembly selector, particularly with an apparatus for separating properly assembled washers and nut elements from washers and nut elements that are not properly assembled.

In telescopically assembling fasteners and washers such as nut elements and lock washers, unassembled or improperly assembled nut elements and washers occasionally are discharged from the telescoping mechanism in spite of all possible precautions and in spite of the high degree of perfection of certain present-day telescoping mechanisms. It is obviously undesirable to have improperly assembled or loose nuts or washers mixed in with perfect assemblies, both from a commercial standpoint and from the standpoint of avoiding jams or damage to further handling apparatus.

An object of this invention is to provide a new or improved mechanism for separating perfect nut and washer assemblies from defective assemblies.

Certain types of nut and washer assemblies present particular difficulties in handling. For example, and as shown by way of illustration in this disclosure, large diameter dished out or concave-convex washers often are preassembled with nut elements of substantially smaller diameter. The configuration of the washers, the discrepancy in diameters of the nuts and washers, and the over-all height of the assemblies all contribute to handling difficulties.

Accordingly, it is an object of this invention to provide mechanism for selecting nut element and washer assemblies of the foregoing type.

A further object of this invention is to provide mechanism for separating perfect and defective nut element and washer assemblies of the foregoing type.

A more specific object of this invention is to segregate perfect nut element and washer assemblies, loose nut elements, loose washers and improperly assembled nut elements and washers of the foregoing type into the individual groups.

Other and further objects and advantages of the present invention will be apparent from the following description when taken in connection with the accompanying drawings wherein:

Fig. 1 is a plan view of an apparatus constructed in accordance with the principles of my invention;

Fig. 2 is a vertical cross-sectional view taken substantially along the line 2—2 of Fig. 1 and showing the washer assembling mechanism;

Fig. 3 is a vertical sectional view taken along the line 3—3 of Fig. 1 and showing the assembly selector ;

Fig. 4 is a fragmentary plan view of the assembly selector taken along the line 4—4 of Fig. 3;

Fig. 5 is a vertical sectional view taken along the line 5—5 of Fig. 4;

Fig. 6 is a fragmentary sectional view similar to Fig. 5 and showing a defective assembly;

Fig. 7 is a perspective view of a part of the assembly selector;

Fig. 8 is a vertical sectional view along the line 8—8 of Fig. 7;

Fig. 9 is a fragmentary plan view of the assembly selector similar to Fig. 4 and showing a modified form of the invention;

Fig. 10 is a perspective view of a portion of the modified form of assembly selector;

Fig. 11 is a cross-sectional view of a nut element and washer in properly telescoped relation, i. e. a perfect assembly of the type referred to throughout this specification; and Fig. 12 is a view similar to Fig. 11 showing the assembly permanently staked together.

In Figs. 1 and 2 there is shown an apparatus for producing unit assemblies of washers and nut elements. In speaking of assemblies or unit assemblies I mean nut elements and washers that have been brought into telescopic association and which may or may not be permanently secured together. The apparatus is inclined for gravitational operation so that the part shown at the upper edge of Fig. 1 is higher than the part shown at the lower edge.

In the machine shown in Figs. 1 and 2 there is an assembly mechanism 18 including a cup-like housing or casing 20 conveniently formed of cast metal. A driving shaft 22 is journaled in suitable bearing in a boss 24 formed on the side of the housing 20. A worm 26 on the end of the shaft 22 meshes with and drives a worm wheel 28 fixed on an upstanding shaft 30 journaled in a boss 31 in the bottom of the housing 20. A cylindrical bushing 32 also is fitted on the shaft 30 and is locked to the worm wheel 28 for rotation therewith by suitable means such as a tooth-in-slot connection 34. The bushing 32 is provided with a radially extending peripheral flange 36 at its lower end.

A pulley 38 also is mounted on the shaft 30 for rotation therewith and is fixed to the bushing 32 for rotation therewith by means such as a tooth-in-slot connection 40. A collar 42 is pinned to the top of the shaft 30 to maintain the pulley 38, the bushing 32, and the worm wheel 28 on the shaft.

A cylinder 44 having a wide peripheral flange 46 at its base fits over the bushing 32 and rests on the flange 36. The cylinder 44 is suitably keyed as at 48 to the bushing 32 for rotation therewith. A washer disc assembly 59 is mounted on the cylinder 44 for rotation therewith and includes a lower, relatively thick circular disc or plate 52 resting on the flange 46. An upper disc or plate 54 is spaced above the disc 52 a short distance by a washer 56. The disc 54 is thick in its central portion and is relieved near the periphery thereof to provide a relatively thin outer edge 58, this edge being of substantially the same thickness as the metal stock of a dished out or concave-convex washer and less than the total over-all height of such a washer. The discs 52 and 54 are provided with aligned recesses 60 which are equally arcuately spaced apart.

A washer member 62 is clamped against the top surface of the disc 54 by a nut 64 threaded on the upper end of the cylinder 44 to clamp the disc assembly 50 in place against the flange 46. Rotation of the disc assembly 50 with the cylinder 44 is insured by a pin 66 fitting through the discs 52 and 54, through the washers 56 and 62, and into the flange 46.

In accordance with the general inclination of the apparatus as brought out heretofore, the disc assembly 50 is inclined with the edge most remotely disposed from the worm 26 being higher than the edge adjacent the worm, and the edge near the boss 24 being slightly higher than the opposite edge. A peripheral wall 68 extends upwardly from the housing or casing 20 substantially in contact with the outer edge of the disc assembly 50. The wall 68 is cut down or terminated at 70 while the wall adjacent the bottom of the disc extends chordally across the top surface of the disc as at 72. An arcuate separator plate 74 extends inwardly from the outer periphery of the disc assembly 50 and from the chordal wall portion 72 substantially to the uppermost edge of the disc adjacent a nut element supply chute (not shown). The arcuate separator plate 74 is supported by legs 78 upstanding from the housing or casing 20.

A dished or concave-convex washer 80 is shown in Figs. 11 and 12 and is provided at its center with a central rim, skirt or flange 84 of substantially frusto-conical configuration. The thin outer edge 58 of the upper plate 54 of the disc assembly 50 is of substantially the same thickness as the metal stock of the washer 80 indicated at 82 at the edge of the washer. Thus, washers which are piled up in a random mass on the lower portion of the disc assembly 50 against the wall 68, 72 settle into the recesses 60 and ride along the top of the separator plate 74. When the washers are correctly oriented with their skirts or flanges 84 upwardly directed, the washers seat firmly in the recesses. When the washers are received in the recess 60 with the washer flanges downwardly directed, the main portions of the washers are above the thin edge 58 of the plate 50 and the washers tend to fall out of the recesses to slide back down the disc assembly into the random mass of washers. Any washers with their flanges downwardly directed which are not displaced from the recesses by gravity and vibration of the machine are deflected from the recesses 60 by the tip 86 of a spring finger 88 mounted on the inner face of the wall 68 by means of screws 90. The screws preferably fit through vertical slots in the wall 68 for adjustment of the finger 88 toward and away from the disc assembly 50 and are threadedly received in an arcuate retaining member 92 for clamping the spring finger against the wall. The lower edge of the finger tip 86 is formed complementary in shape to the washer flanges to pass washers with their flanges upwardly and to engage and deflect washers with their flanges downwardly directed.

Just after passing the finger tip 86, the upright washers pass beyond the end of the separator plate 74 and drop to the bottoms of the recesses 60 in the relatively thick bottom plate 52 to ride on a supporting plate 94 for assembly with nut elements.

Nut elements are dropped on to the top of the washers at the top edge of the disc assembly 50 opposite to the worm gear 26 from a nut element supply chute (not shown). The nut element chute preferably is provided with a release or transfer mechanism (not shown) for releasing nut elements one by one into the recesses 60 centrally thereof as the disc assembly rotates at a constant uniform rate. The details of the nut element supply chute and release mechanism are not of importance in my invention, and accordingly have been omitted.

An agitator 96 is provided to keep the random mass of washers in the hopper-selector 18 stirred up to facilitate their falling into the recesses 60 properly. The agitator 96 (Fig. 1) includes a bracket 98 upstanding along the wall 68 and secured to the housing or casing by means such as screws 100. The bracket includes a pair of arms 102 extending inwardly over the disc assembly 50 and carrying a bearing support 104. The bearing support is inclined slightly from the perpendicular relative to the disc assembly 50 and carries a shaft 106 journaled in a suitable bearing in the bearing support. A wheel (not shown) is mounted on the lower end of the shaft and carries an eccentric finger 114 which is adapted to stir up the random mass of washers. A pulley 116 is mounted on the upper end of the shaft 106 for rotating the same. A flexible belt 118 extends over the pulleys 38 and 116 for driving the latter.

After nut elements have been dropped on top of the washers, the inherent vibration of the machine causes the nut elements to settle on the washers as shown in Fig. 11. Occasionally, in spite of the high degree of perfection in the assembly mechanism, and partly due to the discrepancy in the diameters of the nut elements and washers, a nut element or washer may end up alone in one of the recesses, a nut element may be canted on top of a washer so that it will not telescope properly, or a nut element may slide off to the side without settling telescopically on a washer. Improper settling or lack of telescoping also may be due to a defective nut element or washer or to an inverted nut element or washer. My assembly selector 144 has been provided to separate perfect assemblies from any such defective assemblies.

The assembly selector 144 includes a plate 146 lying parallel to the disc assembly 50 and having an upwardly extending arm 148 underlying the edge of the disc assembly 50 at the end of the supporting plate 94. Washer and nut element assemblies drop a short distance from the plate 94 on to the arm 148 of the plate 146 and are guided away from the disc assembly 50 by a rail 150 on the arm 148 as may be seen in Fig. 1. The rail 150 is secured to the arm 148 by any desirable means and is provided with an offset lower end 152 for guiding loose nuts and washers centrally of the plate 146 as will be brought out hereinafter. A second rail 154 having a beveled lower edge is secured to the arm 148 by means such as screws 156 in parallelism with the rail 150.

A stiffening and mounting plate 158 preferably underlies the plate 146 and is secured to the plate 146 by any suitable means. The plate 158 is provided with a right-angularly disposed flange 160 (Fig. 2) for attachment to the casing 20 of the washer hopper-selector and may be provided with any other suitable flanges or the like for attachment to a machine frame (not shown) for supporting the assembly selector. A block or boss 162 is fixed to the under side of the plate 158, and a sleeve bearing 164 is fixed in suitable apertures in the plate 146 and 158 and in the boss 162 by any conventional means such as a press fit.

A shaft 166 having an enlarged upper end 168 is journaled in the bearing 164. A pulley 169 (Fig. 3) is pinned to the lower end of the shaft 166 and a belt 170 passed over the pulley 169 and a pulley 172 (Fig. 2) on the shaft 30 drives the shaft 166 in synchronism with the shaft 30.

A disc structure 174 fits on the enlarged portion 168 of the shaft 166 and includes a relatively thick circular disc 176 of relatively large diameter. A thinner circular disc 178 of relatively smaller diameter is secured by any suitable means such as bevel head screws to the under side of the disc 176 for rotation therewith, or the disc 178 may be formed integral with the disc 176. A hub 180 is suitably fixed to or formed integral with the larger disc 176 and is provided with a countersunk bore 182 receiving the enlarged end 168 of the shaft 166. A stud 184 is threaded through the top of the hub 180 and engages the top of the enlarged shaft portion 168 adjustably to support the disc structure 174 at any desired height. A jam nut 186 is threaded on the upper end of the stud 184 and tightened against the top of the hub 180 to prevent unauthorized movement of the stud 184.

A set screw or stud 188 is threaded radially into the hub 180 and engages the periphery of the enlarged shaft portion 168. The enlarged shaft portion 168 is circular and is not provided with a flat. Consequently, the enlarged shaft portion 168 and set screw 188 form a frictional or impositive driving connection for the disc structure 174. This allows the disc structure to stop in case there should be a jam in the assembly selector.

A bridge member 190 (Figs. 3, 4, and 7) underlies the disc structure 174 and comprises a pair of elongated leg members 192 and 194 arranged generally parallel to the rails 150 and 154 and integrally connected by a plate or bight portion 196. The plate or bight portion 196 is placed above the plate 146 a sufficient distance to allow loose washers to pass under the bight portion, but is not spaced a sufficient distance to allow loose nut elements to pass thereunder. The upper edge of the bridge 190 is substantially diagonally disposed as indicated at 198 for deflecting nut elements as will be apparent hereinafter.

The bottom of the disc 178 is spaced above the plate 146 a sufficient distance to allow unassembled nut elements and washers to slide thereunder while the bottom of the disc 176 is spaced above the top of the plate 146 a sufficient distance to permit properly telescoped assemblies to pass thereunder.

The bridge 190 is provided with an arcuate edge 200 (Figs. 4 and 7) set in from the edge of the smaller disc 178 a distance substantially equal to the difference between the diameters of the washers and nut elements. The arcuate edge 200 leads into a straight edge 202 extending substantially tangentially from beneath the edge of the disc structure into a channel-shaped feed chute 204. A guide rail 206 is arranged substantially parallel to the edge 202 and includes an internally arcuate upper edge 208 and a diagonally disposed upper edge 210.

The nut elements 212 (Fig. 11) are provided with axially extending necks 214 adapted to fit within the central apertures of the washers 80. Annular grooves 216 are provided about the necks to receive the washer skirts 84.

When the assemblies, designated by the numeral 218, are properly telescoped as shown in Fig. 11, they progress from the disc assembly 50 down the arm 148 between the rails 150 and 154 and pass beneath the larger disc 176 with the nut elements engaging against the lower disc 178 as shown in Figs. 3, 4, and 5. The rotating disc structure carries the assemblies 218 around until they engage between the arcuate edges 200 and 208 of the bridge 190 and rail 206. The straight edge 202 of the bridge then guides the assemblies away from the disc structure and into the feed chute 204.

Defective assemblies which are improperly telescoped through one cause or another, such as the nut element being canted on the washer or a nut element or washer of improper dimensions, are too high and cannot pass beneath the larger disc 176 as shown in Figs. 4 and 6 at 218d. The disc structure 174 then carries the defective assemblies around until they engage the beveled upper edge 210 of the rail 206 which guides the defective assemblies off the edge of the plate 146 where they preferably are received in a suitable receptacle (not shown).

Separate, loose, or unassembled washers 80 and nut elements 212 passing on to the plate 146 are deflected by the offset portion 152 at the lower end of the rail 150 to move toward the center of the bridge 190. The washers 80 pass under the plate or bight portion 196 (Figs. 4, 7, and 8) of the bridge and continue to move down the plate to drop off the lower edge preferably into a suitable receptacle (not shown). Nut elements, as noted heretofore, cannot pass beneath the bridge 190. Accordingly, they engage the diagonally disposed upper edge 198 (Figs. 4 and 8) and ride along this edge to fall off the plate 146 preferably into another suitable receptacle (not shown).

Perfect assemblies 218 passing down the feed chute 204 under the action of gravity are fed to a staking unit or mechanism 220 (Fig. 1). The staking unit may comprise a hollow base or frame carrying a downwardly extending anvil comprising a stud 224 threaded through the top of the frame 222 and locked in place by a jam nut 226, the bottom of the stud being exposed just above the path of the assemblies. The staking unit further may include a slide 228 reciprocable transversely of the feed chute 204 under the influence of a spring 230 and a cam follower (not shown) on a pin 232 engaging the face of a cam 234 on a shaft 236. The slide 228 may be provided with a notch for receiving and positioning the assemblies 218 beneath the lower end of the anvil stud 224. A cam on the shaft 236 reciprocates a staking pin having a frusto-conical tip for swaging the nut element necks 214 outwardly beneath the washer skirts or flanges 84 from the position shown in Fig. 11 to the position shown in Fig. 12 permanently to strap the washer on the nut element, and free for rotation relative thereto. Reciprocation of the slide 228 after staking of the assemblies ejects the assemblies from the side of the staking unit from whence they may drop into a suitable receptacle (not shown). The shaft 236 may be driven from the same power source as the shaft 22 if desired.

A modification of the assembly selector is shown in Figs. 9 and 10 and similar parts therein are identified by similar numerals with the addition of the suffix a. The assembly selector 144a includes a plate 146a having an upwardly extending arm 148a. Rails 154a and 150a extend down the arm 148a on to the plate 146a. The rail 150a is provided with an offset lower end 152a while the lower end of the rail 154a is beveled.

The assembly selector 144a is provided with a disc structure 174a identical in construction with the one heretofore disclosed and including a large disc 176a and a smaller disc 178a. The disc structure 174a is mounted in the same manner as the disc structure 174 on a shaft having an enlarged upper end 168a and supported in part in a block or boss 162a on the under side of the assembly selector. The assembly selector further is provided with a rail 206a having an arcuate inner upper edge 208a and a beveled outer upper edge 210a.

The remainder of the assembly selector 144a differs slightly from the previously disclosed embodiment. A rail 193 similar to one leg of the bridge 190 and having an arcuate upper edge 200a and a lower straight edge 202a is fixed to the plate beneath the disc structure 174a.

A diagonally disposed bridge member 190a is positioned downwardly of the disc structure 174a and at the lower end of the rail 193. The bridge 190a as shown in Figs. 9 and 10 comprises a diagonally disposed strip having legs 192a and 194a supporting a central bight portion 196a a sufficient distance above the plate 146a to permit passage of washers, but sufficiently low to engage and deflect nut elements.

The plate 146a is somewhat longer than the plate 146 to accommodate the bridge member 190a externally of the disc structure. Accordingly, a pair of rails 220 is fixed on the plate to guide assemblies from the rails 193 and 206a to a feed chute (not shown).

Operation of the embodiment of the assembly selector shown in Figs. 9 and 10 is similar to that previously described. Perfect assemblies 218 are carried around by the smaller disc 178a to the space between the rails 193 and 206a. Improperly telescoped assemblies are engaged by the larger disc 176a and are carried around to engage the angularly disposed edge 210a to be guided off the edge of the plate 146a.

Unassembled nut elements and washers pass beneath the disc structure 174a between the enlarged shaft portion 168a and the rail 193. Upon passing out from the disc structure, nut elements 212 engage the upper edge of the bridge 190a and are deflected off the side of the plate 146a. The washers 80 continue down the plate 146a beneath the bridge 190a to drop off the lower edge of the plate 146a.

It will be understood that the perfect assemblies 218 pass on down between the rails 220 preferably to a chute leading to a staking unit, and that the improperly telescoped assemblies and the loose nuts and washers preferably drop into suitable receptacles.

Although for purposes of illustration my assembly selector has been shown as receiving telescoped assemblies from an assembling mechanism prior to permanent fastening together of the washers and nut elements, it will be understood that the washers and nut elements could be permanently assembled before being acted upon by my assembly selector.

The assembly selector as shown herein by virtue of the two discs or disc portions of different diameter is adapted to handle assemblies comprising washers and nut elements having considerably different diameters. The selector also is capable of acting upon nut element and washer assemblies of considerable over-all height and of unique configuration, in addition to widely different diameters, to segregate perfect assemblies, unassembled nut elements, unassembled washers and incompletely or defectively telescoped nut elements and washers.

It will be understood that the particular examples shown and described are for illustrative purposes only and that my invention is limited only by the spirit and scope of the appended claims.

I claim:

1. Mechanism for separating perfect assemblies of nut elements and washers from improperly assembled and loose nut elements and washers comprising means for feeding assembled and loose nut elements and washers along a predetermined inclined planar path, rotary means spaced from said path in a direction normal to the plane of said path and rotatable about an axis which is arranged at an angle other than a straight angle relative to the plane of said path, means for rotating said rotary means, and said rotary means having a plurality of portions spaced different distances from said path and presenting stepped edges which are continuous with the line of travel of the rotary means to continuously traverse said path for engaging and guiding perfect and imperfect assemblies along different paths, the stepped portion of the rotary means closest to said path being spaced thereabove a distance permitting passage thereunder of loose nut elements and washers for feeding along other paths.

2. Mechanism as set forth in claim 1 wherein the rotary means is rotatable about an axis perpendicular to said planar path.

3. Mechanism as set forth in claim 1 wherein the rotary means comprises a stepped disc having the portions differently spaced from said planar path separated by definite breaks with the smaller diameter portion of the stepped disc disposed closest to the planar path.

4. Mechanism as set forth in claim 3 wherein the disc is rotatable about an axis perpendicular to said planar path.

5. Mechanism as set forth in claim 3 wherein the portions of the rotary disc differently spaced from said planar path provide flat surfaces parallel to said planar path.

6. Mechanism for separating perfect assemblies of nut elements and washers from improperly assembled and loose nut elements and washers comprising a slide plate inclined at an acute angle to the horizontal and adapted slidingly to transport assembled and loose nut elements and washers, rotary means spaced from said slide plate in a direction normal thereto and rotatable about an axis arranged at an angle other than a straight angle relative to the plane of said slide plate, means for rotating said rotary means, and said rotary means having a plurality of portions spaced different distances from said slide plate and presenting stepped edges which are continuous with the line of travel of the rotary means to continuously engage and guide perfect and imperfect assemblies along different paths, the stepped portion of the rotary means closest to said slide plate being spaced thereabove a distance permitting passage thereunder of loose nut elements and washers for feeding along other paths.

7. Mechanism as set forth in claim 6 wherein the rotary means is rotatable about an axis perpendicular to said slide plate.

8. Mechanism as set forth in claim 6 wherein the rotary means comprises a stepped disc having distinct breaks between the portions spaced differently from the slide plate with the smaller diameter portion of the stepped disc disposed closest to the planar path.

9. Mechanism as set forth in claim 8 wherein the disc is rotatable about an axis perpendicular to the slide plate.

10. Mechanism for segregating perfect assemblies of nut elements and washers, imperfect assemblies thereof, and loose nuts and washers comprising means for feeding a plurality of properly and improperly assembled nut elements and washers and loose nut elements and washers along a predetermined inclined path, rotary means spaced from and overlying said path and rotatable about an axis which is arranged at an angle other than a straight angle relative to the plane of said path, said rotary means having portions spaced different distances from said path in order differently to cooperate with perfect and imperfect assemblies according to their heights to feed the same along different paths, loose nut elements and washers passing beneath the portion of said rotary means disposed closest to said path, and a bridge disposed diagonally across the path of travel of the loose nut elements and washers and beneath and within the confines of said rotary means, said bridge being spaced above the path of travel of the loose nut elements and washers a distance to pass loose washers thereunder and to deflect loose nut elements therealong.

11. Mechanism as set forth in claim 10 wherein the means for feeding the properly and improperly assembled nut elements and washers and loose nut elements and washers comprises a slide plate inclined at an acute angle to the horizontal.

12. Mechanism as set forth in claim 11 wherein the rotary member comprises a stepped disc having distinct breaks between the portions spaced differently from the slide plate and with the portion of smallest diameter disposed closest to the slide plate.

13. Mechanism as set forth in claim 12 wherein the bridge lies between the disc and the slide plate substantially within the periphery of said disc.

14. Mechanism as set forth in claim 12 wherein the bridge member is positioned farther along said predetermined path than said disc.

15. Mechanism for separating perfect assemblies of nut elements and washers from improperly assembled and loose nut elements and washers comprising a slide plate inclined at an acute angle to the horizontal and adapted slidingly to transport such perfect and imperfect assemblies and loose nut elements and washers, rotary means spaced normally from and overlying said plate and rotatable about an axis perpendicular to said slide plate, said rotary means being differently cooperable with perfect and imperfect assemblies and with loose nut elements and washers, a feed chute joining said feed plate substantially radially of said rotary means for feeding assemblies and loose nut elements and washers on to said slide plate, a feed chute arranged substantially tangentially of said rotary means for receiving perfect assemblies carried thereto by said rotary means, and means for rotating said rotary means to carry perfect assemblies substantially from said substantially radial feed chute to said substantially tangential feed chute.

16. Mechanism as set forth in claim 15 wherein the radial and tangential feed chutes are spaced substantially 90 degrees about said rotary means.

17. Mechanism as set forth in claim 15 wherein the rotary means comprises a stepped disc having portions differently spaced from said slide plate and differently cooperable with perfect and imperfect assemblies and loose nut elements and washers in accordance with their heights and with the portion of the disc nearest the slide plate having the smallest diameter.

References Cited in the file of this patent

UNITED STATES PATENTS

| 1,492,867 | Thompson | May 6, 1924 |
| 1,627,699 | Griswold | May 10, 1927 |
| 2,364,187 | Birdsall | Dec. 5, 1944 |
| 2,390,741 | Scott et al. | Dec. 11, 1945 |
| 2,630,224 | Kinnebrew | Mar. 3, 1953 |
| 2,643,766 | Nordquist | June 30, 1953 |
| 2,699,253 | Miller | Jan. 11, 1955 |

FOREIGN PATENTS

| 636,773 | Great Britain | May 3, 1950 |